Oct. 16, 1945.　　　W. P. REILLY ET AL　　　2,386,977
FASTENER FOR BELTS
Filed Dec. 22, 1943
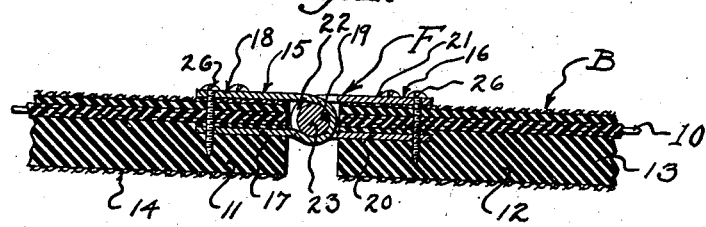
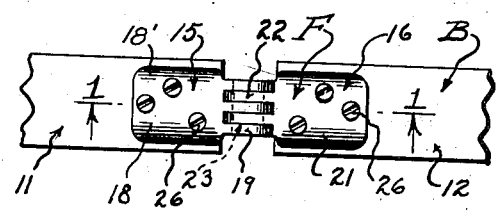
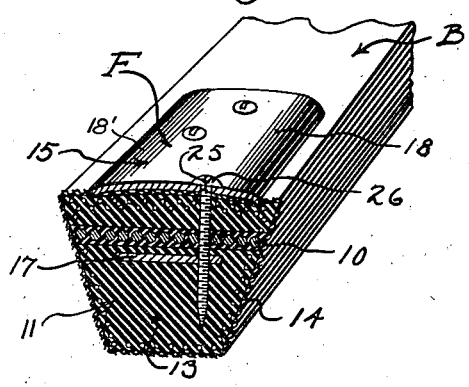
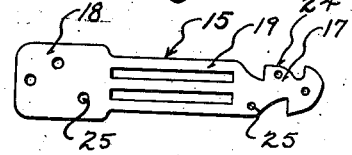
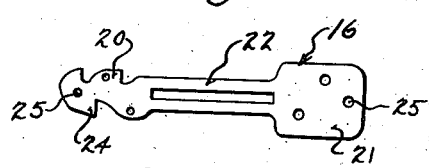
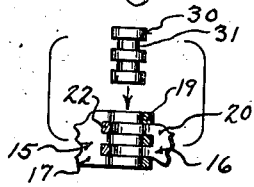
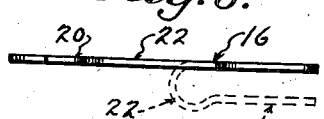
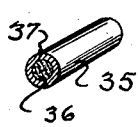
INVENTORS
and WILLIAM P. REILLY
CHARLES W. TINGLEY
BY
ATTORNEYS Patented Oct. 16, 1945

2,386,977

UNITED STATES PATENT OFFICE 2,386,977

FASTENER FOR BELTS

William P. Reilly, Menomonie Falls, and Charles W. Tingley, Milwaukee, Wis.

Application December 22, 1943, Serial No. 515,274

4 Claims. (Cl. 24—33)

This invention appertains to drive belts and more particularly to a novel fastener particularly adapted for connecting the ends of V-belts and is a division of and an improvement on our Patent No. 2,362,949 patented November 14, 1944.

In our patent above mentioned, we fully disclosed our fastener for connecting the ends of V and other drive belts formed from rubber, composition or leather without the use of special tools.

One of the primary objects of this invention is to provide novel means for forming the inner and outer leaves of the sections of the fastener so that upon the tightening of the self-tapping screws and the bringing of the leaves toward one another, the excess material of the belt formed by the insertion of the inner leaf therein will be accommodated by the outer leaf and whereby the belt ends will be firmly held and gripped.

Another salient object of our invention is to arch the outer leaves of the sections of the fastener transversely so as to accommodate the belt material as the inner leaf is brought toward the outer leaf and whereby longitudinally extending side gripping flanges will be formed on the outer leaves for engaging and gripping the belt.

A further object of our invention is to so construct the inner leaf that the same will occupy a minimum amount of space in the belt and whereby the same will be of a less width than the outer leaf so that upon the tightening of the screws, the belt material will be effectively compressed and gripped by the inner and outer leaves.

A further important object of our invention is to provide novel means for forming the hinge barrels on the sections of the fastener, whereby a rocker pin of maximum diameter will be accommodated for strength and wearing surface and whereby the pin will be brought toward the center axis of the belt.

A still further object of our invention is to provide a novel rocker pin which will have a maximum amount of strength and durability and which will effectively lubricate the hinge barrels, whereby to effectively reduce wear on the hinge barrels and pin to a minimum.

With these and other objects in view, the invention consists in the novel construction, arrangement, and formation of parts, which will be hereinafter more fully described, claimed, and illustrated in the accompanying drawing, in which drawing:

Figure 1 is a longitudinal, sectional view through the meeting ends of a V-belt showing our improved fastener applied thereto, the section being taken substantially on the line 1—1 of Figure 2 looking in the direction of the arrows.

Figure 2 is a fragmentary, top, plan view of the meeting ends of a V-belt showing our fastener applied thereto.

Figure 3 is an enlarged, fragmentary, sectional, perspective view.

Figure 4 is a top, plan view of one section, or part, of the fastener, showing such part prior to being folded into shape.

Figure 5 is a top, plan view of the other section, or part, of the fastener prior to being folded into shape.

Figure 6 is a side, elevational view of the section, or part, shown in Figure 5, the part being shown in full lines in its non-folded condition and in dotted lines in its folded condition.

Figure 7 is a detail, fragmentary, horizontal sectional view taken at right angles to Figure 1, and showing the use of a modified form of pin, the figure being an exploded view to illustrate the manner of associating the pin with the sections or parts of the fastener.

Figure 8 is a top, plan view of our fastener, partly broken away and in section, showing the parts thereof united by the modified form of rocker pin.

Figure 9 is a detail, perspective view of a still further modified form of rocker pin.

Referring to the drawing in detail, wherein similar reference characters designate corresponding parts throughout the several views, the letter F generally indicates our novel fastener for a belt B.

For the purpose of illustration, the belt B is shown of the V-type reinforced by longitudinally extending cords 10, but it is to be understood that the fastener can be used on various types of belts and can be effectively employed for connecting all characters and cross sectional sizes of V-belts.

As shown, the belt B includes companion ends 11 and 12, which are adapted to be connected by our fastener F. The belt, itself, in the present showing, includes a rubber body 13 reinforced by the cords 10 and protected by a fabric casing 14. The cords 10 are disposed on one side of the longitudinal center of the belt, namely, on the expansion side of the belt.

Our fastener F includes companion sections, or parts, 15 and 16 which are adapted to be firmly secured respectively to the belt ends 11 and 12. The section, or part, 15 includes inner and outer leaves 17 and 18 integrally connected together by a slotted hinge barrel 19. The companion section, or part, 16 includes inner and outer leaves 20 and 21 integrally connected by a slotted hinge barrel 22. These sections, or parts, 15 and 16 can be readily stamped flat from blanks of sheet metal and these stamped parts, or sections are clearly shown in Figures 4 and 5. After the parts, or sections, are stamped out, the same can be folded into a U-shape so that the outer leaves will overlie the inner leaves.

The hinge barrels 19 and 22 are so formed that the barrels will interfit for the reception of a hinge or rocker pin 23. The hinge barrels are in the nature of circular shaped loops and these loops are the exact shape of the rocker pin. This reduces wear by avoiding a pinching action. These hinge barrels or loops are offset inwardly toward the center axis of the belt and as the barrels or loops are of a relatively large diameter, a pin of maximum diameter can be accommodated by said barrels or loops. The pin forms an important feature of this invention and will be later described, in detail.

The inner leaves 17 and 20 of the sections, or parts, 15 and 16 of the fastener are of a less width than the outer leaves as can be readily seen by referring to Figures 4, 5, and 8 of the drawing, and are so arranged that a minimum amount of distortion of the belt results from the insertion thereof into the belt material. Thus these inner leaves are of an irregular shape and define laterally extending ears 24. The leading edges of these leaves and their ears are tapered so as to facilitate the insertion of these leaves in the belt material and obviously when the belt material is compressed, the same will be forced in the spaces between the ears.

The leaves of the sections 15 and 16 are provided with openings 25 for the reception of pointed self-tapping metal screws 26 and the openings are staggeredly related relative to one another so that the screws and openings are out of line.

In applying the sections, or parts, 15 and 16, of the fastener to the belt ends 11 and 12, it is merely necessary to take a sharp instrument, such as a pen knife, and slit the belt ends inwardly directly below the reinforcing cords 10 leaving the fabric casing 14 intact. The inner leaves 17 and 20 of the sections, or parts, 15 and 16 are now forced into the slits with the outer leaves riding on the outer face of the belt ends. The pointed terminals of the inner leaves facilitate the forcing of the inner leaves into the belt. After the insertion of the leaves into proper position on the belt ends, the pointed self-tapping screws 26 are now threaded into the openings 25 and into the belt material a considerable distance below the inner leaves, as is clearly shown in Figure 3. As the screws 26 are forced into place by the use of an ordinary screw driver, the same will effectively cut their own threads in the lower leaf and the openings 25 are so disposed as to allow the screws to extend into the belt material between adjacent reinforcing cords 10 so as to prevent the rupturing of these cords and this is facilitated by the pointed terminals of the screws. The inner ends of the screws enter into the belt material below the lower leaf and hence the screws not only function to draw the inner and outer leaves toward one another, but also function to draw the rubber up below the lower leaf against and around the lower leaf. Attention is drawn to the fact that the outer leaves are arched transversely as at 18' and hence as the leaves are drawn toward one another, the belt material will be pushed up into the arch of the upper leaves and the sharp longitudinal edges of the upper leaves will bite into and grip the outer surface of the belt. Thus the material forced out of position by the insertion of the inner leaves into the belt will be accommodated by the arched outer leaves.

As the sections, or parts, 15 and 16 have been connected to the belt ends, the hinge barrels 19 and 22 are interconnected and the hinge or rocker pin 24 is placed in position. The ends of the belt are now effectively connected.

Particular attention is directed to the fact that each of the fastener sections, or parts, 15 and 16 include a plurality of hinge barrels or loops and thus the strain or pull on the rocker pin is distributed throughout the length of the pin and the breaking of the pin is avoided. Where the pull is on the ends of the pin and on the center of the pin only, the breaking or cutting off of the pin is liable to occur.

The fastener can be easily applied to the ends of a belt without the dismantling of a machine and the fastener can be used for effectively connecting broken ends of endless cord V-belts and the belts can be readily matched for use in multiple sets. In our fastener the bottom and sides of the belt are entirely free from all obstructions and thus the belts will ride over the pulleys without chatter and the belts can be used on smooth flat faced pulleys.

Much stress is laid on the fact that when the screws are threaded into place, the leaves will be brought toward one another for gripping the belt material and that the belt material will be forced into the arch of the outer leaves.

Also, stress is laid on the circular hinge barrels or loops offset inwardly toward the neutral axis of the belt for accommodating a pin of maximum diameter and it is noted that the shape of the pin closely approximates the shape of the hinge barrels.

While pins of various types can be used with the sections of our fastener, we have found a new type of pin which will give a maximum amount of wear and which will be self-lubricating so as to eliminate undue wear. Thus the pin 23 is formed from composition material and preferably the same material as is used in the brushes of electric motors. This material is composed of carbon and graphite as the main substances, and the graphite acts as the desired lubricant.

If preferred, we can provide a graphite and carbon pin 30, (see Figures 7 and 8) having annular grooves 31 in line with the hinge barrels or loops 22 of the section or part 16. In using this type of pin, the barrels of the sections are interfitted and the pin is then slipped into place in the hinge barrels. As the sections 15 and 16 of the fastener are drawn apart, the hinge barrels or loops 22 will fit in the grooves 31 and this will prevent the accidental displacement of the pin.

In Figure 9 we have illustrated a reinforced pin 35. The pin 35 includes a center core 36 of steel or other strong material and an outer sleeve 37 formed from carbon and graphite.

From the foregoing description it can be seen that we have provided a novel fastener which will effectively unite the ends of a V or other belt together and which can be applied to belt ends without the use of special tools or equipment.

Changes in details may be made without departing from the spirit or the scope of our invention, but what we claim as new is:

1. A fastener for connecting the ends of a belt together comprising a pair of companion sections, each of said sections including a U shaped member having inner and outer leaves and a connecting hinge barrel, the hinge barrel of one section being adapted to interfit with the hinge barrel of the other section, a rocker pin operatively connecting the hinge barrels of the companion sections, the inner leaf of each section being of a less width than the outer leaf and being adapted to be inserted in the material of a belt end, and screws adapted to be inserted into the belt material through the leaves for drawing said leaves toward one another into gripping contact with the belt material, the outer leaves being arched transversely to accommodate the belt material displaced by the insertion of the narrow inner leaves into the belt ends.

2. A fastener for connecting the ends of a belt together comprising a pair of companion sections, each of said sections including a U shaped member having inner and outer leaves and a connecting hinge barrel, the hinge barrel of one section being adapted to interfit with the hinge barrel of the other section, a rocker pin operatively connecting the hinge barrels of the companion sections, the inner leaf of each section being of a less width than the outer leaf and being adapted to be inserted in the material of a belt end, and screws adapted to be inserted into the belt material through the leaves for drawing said leaves toward one another into gripping control with the belt material, the outer leaves being arched transversely to accommodate the belt material displaced by the insertion of the narrow inner leaves into the belt ends, and said outer leaves having longitudinal side edges for gripping the outer face of the belt.

3. In a belt fastener, a fastener section including companion inner and outer leaves and a connecting hinge barrel, the inner leaf being adapted to be inserted into the belt intermediate the inner and outer surfaces thereof and said inner leaf including a narrow body portion and laterally projecting ear portions.

4. In a belt fastener, a fastener section including companion inner and outer leaves and a connecting hinge barrel, the inner leaf being adapted to be inserted into the belt intermediate the inner and outer surfaces thereof and said inner leaf including a narrow body portion and laterally projecting ear portions, said ear portions having inclined leading edges and abrupt trailing edges.

WILLIAM P. REILLY.
CHARLES W. TINGLEY.